United States Patent
Xue et al.

(10) Patent No.: US 11,432,325 B2
(45) Date of Patent: Aug. 30, 2022

(54) METHODS, APPARATUSES AND SYSTEMS FOR USER EQUIPMENT (UE)-TO-UE SHARING OF CHANNEL OCCUPANCY TIME

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Aleksandar Damnjanovic, Del Mar, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/924,584

(22) Filed: Jul. 9, 2020

(65) Prior Publication Data

US 2021/0014892 A1    Jan. 14, 2021

Related U.S. Application Data

(60) Provisional application No. 62/873,007, filed on Jul. 11, 2019.

(51) Int. Cl.
*H04W 4/00* (2018.01)
*H04W 74/08* (2009.01)
(Continued)

(52) U.S. Cl.
CPC ....... *H04W 74/0808* (2013.01); *H04W 16/14* (2013.01); *H04W 72/042* (2013.01);
(Continued)

(58) Field of Classification Search
None
See application file for complete search history.

(56) References Cited

U.S. PATENT DOCUMENTS

2018/0368090 A1\* 12/2018 Kadambar ............ H04W 76/14
2019/0159256 A1\*  5/2019 Talarico ................ H04L 1/1887
(Continued)

OTHER PUBLICATIONS

Broadcom, et al., "Proposals for Channel Access Procedures for NR—Unlicensed", 3GPP Draft, 3GPP TSG RAN WG1 Meeting #95, R1-1813565, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051555620, 9 pages, Retrieved from the Internet: URL: http://www.3gpp.org/ftp/Meetings%5F3GPP%5FSYNC/RAN1/Docs/R1%2D1813565%2Ezip [retrieved on Nov. 11, 2018] the whole document.
(Continued)

*Primary Examiner* — Clemence S Han
(74) *Attorney, Agent, or Firm* — Liem T. Do

(57) ABSTRACT

Methods, systems, and devices for wireless communication are described. A base station may determine a configuration for UE-to-UE sharing of a channel occupancy time (COT) and may transmit the configuration to a UE to indicate that it can share a UE-acquired COT with at least another UE. A UE may acquire a COT using a listen-before-talk (LBT) procedure, and if successful, may transmit a signal indicating that the COT is being shared with at least another UE. Additionally, a UE may receive a signal from another UE indicating that it has acquired a COT in a shared spectrum and that the COT is being shared with other UEs. The UE may perform a shortened LBT procedure within the COT, and if successful, may transmit an uplink transmission in the shared spectrum.

29 Claims, 12 Drawing Sheets

(51) Int. Cl.
*H04W 16/14* (2009.01)
*H04W 72/04* (2009.01)
*H04W 76/27* (2018.01)
*H04W 72/14* (2009.01)

(52) U.S. Cl.
CPC ....... *H04W 72/0413* (2013.01); *H04W 72/14* (2013.01); *H04W 76/27* (2018.02)

(56) References Cited

U.S. PATENT DOCUMENTS

| | | | | |
|---|---|---|---|---|
| 2020/0052865 | A1* | 2/2020 | Liou | H04W 72/042 |
| 2020/0053798 | A1* | 2/2020 | Tsai | H04W 72/14 |
| 2020/0267633 | A1* | 8/2020 | Bendlin | H04W 4/20 |
| 2020/0305184 | A1* | 9/2020 | Kim | H04W 72/1289 |
| 2020/0314889 | A1* | 10/2020 | Cirik | H04L 5/0098 |
| 2020/0314948 | A1* | 10/2020 | Babaei | H04W 52/00 |
| 2020/0322982 | A1* | 10/2020 | Wu | H04W 72/1284 |
| 2020/0351669 | A1* | 11/2020 | Xu | H04W 74/0808 |
| 2020/0351941 | A1* | 11/2020 | Aldana | H04W 72/12 |
| 2020/0359411 | A1* | 11/2020 | Li | H04W 72/1268 |
| 2021/0274555 | A1* | 9/2021 | Alfarhan | H04W 74/0808 |

OTHER PUBLICATIONS

Charter Communications: "Remaining Aspects of Channel Access", 3GPP Draft, 3GPP TSG RAN WG1 Meeting #97, R1-1907122 Remaining Aspects of Channel Access, 3rd Generation Partnership Project (3GPP), Mobile Competence Centre, 650, Route Des Lucioles, F-06921, Sophia-Antipolis Cedex, France, vol. RAN WG1, No. Reno, NV; May 13, 2019-May 17, 2019, May 13, 2019 (May 13, 2019), XP051728568, 4 pages, Retrieved from the Internet: URL: http://www.3gpp.org/ftp/Meetings%5F3GPP%5FSYNC/RAN1/Docs/R1%2D1907122%2Ezip.

Google: "Discussion on Channel Access Procedure," 3GPP Draft, 3GPP TSG RAN WG1 #97, R1-1907374, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728812, 4 pages, Retrieved from the Internet: URL: http://www.3gpp.org/ftp/Meetings%5F3GPP%5FSYNC/RAN1/Docs/R1%2D1907374%2Ezip [retrieved on May 13, 2019] the whole document.

International Search Report and Written Opinion—PCT/US2020/041576—ISA/EPO—dated Nov. 2, 2020.

NTT Docomo, et al., "Channel Access Procedures for NR-U operation", 3GPP Draft, 3GPP TSG-RAN WG2 Meeting #103, R1-1813313, Channel Access Procedures for NR-U Operation, 3rd Generation Partnership Project (3GPP), Mobile Competence Centre, 650, Route Des Lucioles, F-06921 Sophia-Antipolis Cedex, vol. RAN WG1. No. Spokane, USA, Nov. 12, 2018-Nov. 16, 2018, Nov. 11, 2018 (Nov. 11, 2018), XP051555340, 5 pages, Retrieved from the Internet: URL: http://www.3gpp.org/ftp/Meetings%5F3GPP%5FSYNC/RAN1/Docs/R1%2D1813313%2Ezip.

Qualcomm Incorporated: "Channel Access tor Autonomous UL Access", 3GPP Draft, 3GPP TSG RAN WG1 #91, R1-1720406 Channel Access for Autonomous UL Access, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051369969, pp. 1-4, Retrieved from the Internet: URL: http://www.3gpp.org/ftp/tsg%5Fran/WG1%5FRL1/TSGR1%5F91/Docs/, [retrieved on Nov. 18, 2017].

Qualcomm Incorporated: "Channel Access Procedures tor NR unlicensed," 3GPP Draft, 3GPP TSG RAN WG1 Meeting #97, R1-1907261, 7.2.2.2.1, Channel Access Procedures for NR Unlicensed, 3rd Generation Partnership Project (3GPP), Mobile Competence Centre, 650, Route Des Lucioles, F-06921, Sophia-Antipolis Cedex, France, vol. RAN WG1, No. Reno, US; May 13, 2019-May 17, 2019, May 13, 2019 (May 13, 2019), XP051728701, 18 pages, Retrieved from the Internet: URL: http://www.3gpp.org/ftp/Meetings%5F3GPP%5FSYNC/RAN1/Docs/R1%.

* cited by examiner

METHODS, APPARATUSES AND SYSTEMS FOR USER EQUIPMENT (UE)-TO-UE SHARING OF CHANNEL OCCUPANCY TIME

CLAIM OF PRIORITY

The present application for patent claims priority to U.S. Provisional Application No. 62/873,007 by Yisheng Xue et al., entitled "METHODS, APPARATUSES AND SYSTEMS FOR USER EQUIPMENT (UE)-TO-UE SHARING OF CHANNEL OCCUPANCY TIME," filed Jul. 11, 2019, which is hereby incorporated by reference in its entirety as if fully set forth below and for all applicable purposes.

BACKGROUND

The following relates generally to wireless communication, and more specifically to methods, apparatuses, and systems for user equipment (UE)-to-UE sharing of a channel occupancy time (COT) in a shared radio frequency spectrum (or shared spectrum).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In NR, it has been contemplated that the system will support some modes of communications over a shared spectrum or unlicensed radio frequency spectrum of a cellular network. In this regard, techniques for reserving the medium, such as listen-before-talk (LBT), for a duration of time (e.g., transmission opportunity (TXOP) or channel occupancy time (COT)) have been developed to ensure fairness and coexistence among devices operating in the shared spectrum. For example, a category 4 (CAT4) LBT has been employed as a fundamental channel access scheme to achieve fair channel access, within a technology and across different technologies. However, the CAT4 LBT may come at a cost in terms of implementation complexity. Furthermore, it may be inefficient use of radio resources when transmitting a small payload. In some deployments, COT sharing is a technique that has been proposed to reduce the use of CAT4 LTB without compromising channel access fairness. More specifically, a base station can perform a CAT4 LBT to acquire a COT and share the COT with its UEs for scheduled uplink transmission. Accordingly, the UEs may use a shortened LBT procedure when transmitting within the base station acquired COT. Therefore, improved techniques for enabling UE-to-UE COT sharing may be desirable.

SUMMARY

The described techniques relate to improved methods, systems, devices, and apparatuses that support UE-to-UE sharing of a COT in shared spectrum. In an aspect, a method of wireless communications includes acquiring, by a first user equipment (UE), a channel occupancy time (COT) in a shared spectrum using a listen-before-talk (LBT) procedure, and responsive to a successful LBT procedure, transmitting, by the first UE, a signal indicating that the COT is being shared with at least one second UE.

In some aspects, a method of wireless communications includes receiving, at a first user equipment (UE), a signal from a second UE, the signal indicating that the second UE has acquired a channel occupancy time (COT) in a shared spectrum and that the COT is being shared with one or more UEs, and performing, by the first UE, a shortened listen-before-talk (LBT) procedure within the COT. The method also includes responsive to a successful shortened LBT procedure, transmitting, by the first UE, an uplink transmission in the shared spectrum.

In another aspect, a method for wireless communications includes determining, by a base station, a configuration for user equipment (UE)-to-UE sharing of a channel occupancy time (COT) in a shared spectrum, and transmitting, from the base station to a first user equipment (UE), the configuration to indicate that the first UE can share a UE-acquired COT with at least one second UE.

In other aspects, a UE for wireless communications includes a processor, memory in electronic communication with the processor, and instructions stored in the memory. The instructions are executable by the processor to acquire a channel occupancy time (COT) in a shared spectrum using a listen-before-talk (LBT) procedure, and responsive to a successful LBT procedure, to transmit a signal indicating that the COT is being shared with at least one second UE.

In some aspects, a UE for wireless communications includes a processor, memory in electronic communication with the processor, and instructions stored in the memory. The instructions are executable by the processor to receive a signal from a second UE, the signal indicating that the second UE has acquired a channel occupancy time (COT) in a shared spectrum and that the COT is being shared with one or more UEs. Additionally, the instructions are executable by the processor to perform a shortened listen-before-talk (LBT) procedure within the COT, and responsive to a successful shortened LBT procedure, to transmit an uplink transmission in the shared spectrum.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Aspects of the disclosure are initially described in the context of a wireless communications system. Examples of techniques for long term channel sensing are described herein. Aspects of the disclosure are further illustrated by and described with reference to apparatus diagrams, system diagrams, flowcharts, and appendix that support various configurations of bandwidth parts in a shared spectrum.

Figure 1:
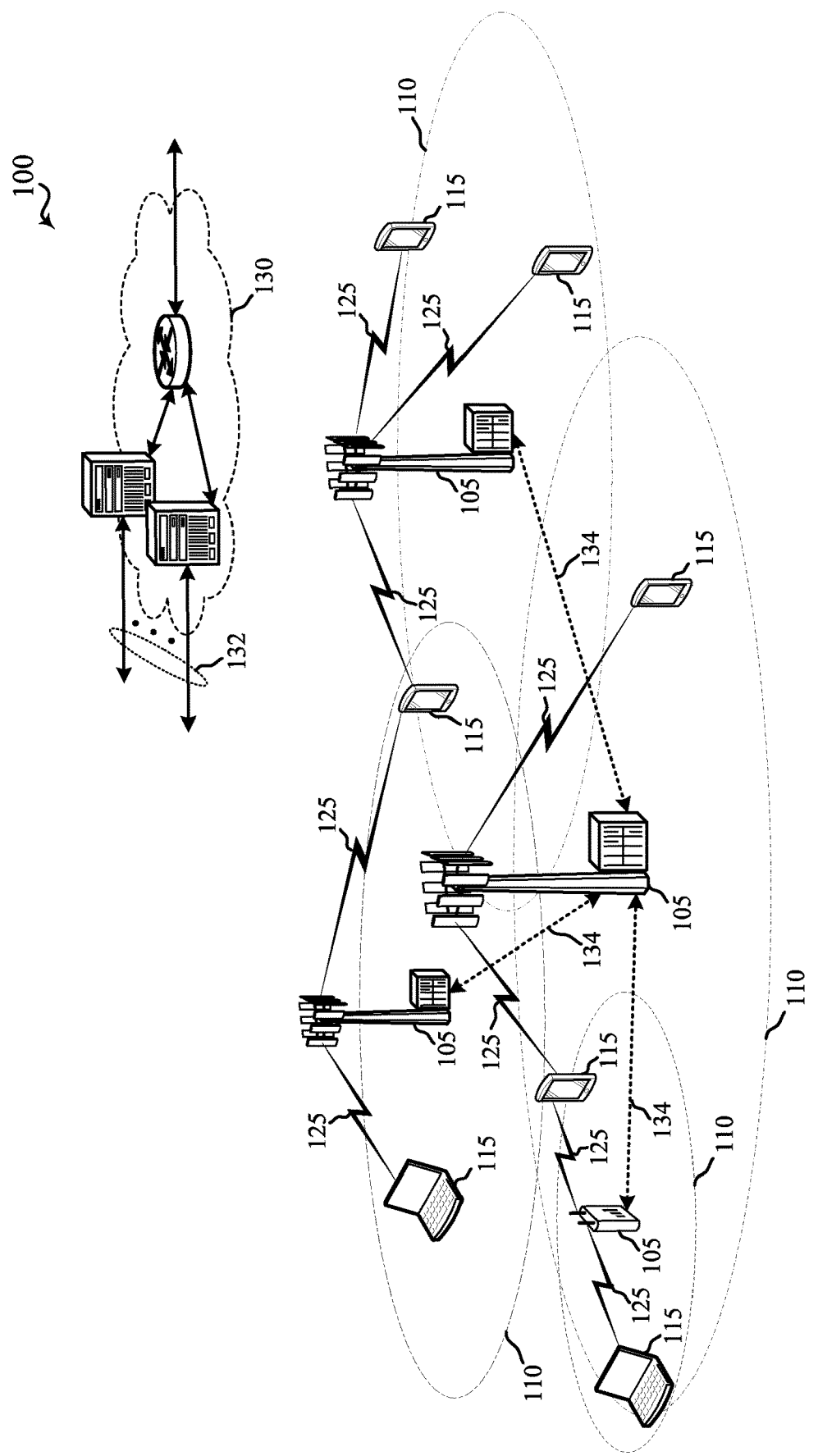
FIG. 1 illustrates an example of a system for wireless communication in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a New Radio (NR) network, a Long Term Evolution (LTE) network, or an LTE-Advanced (LTE-A) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC devices may build on MTC protocols and support lower bandwidths in the uplink or downlink, lower data rates, and reduced transmit power, culminating in significantly longer battery life (e.g., extending batter life for several years). References to an MTC may also refer to an eMTC configured device.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed (NR-U), such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

It may be desirable for a UE to share its channel occupancy time (COT) with other UEs in some scenarios. For example, UEs may perform random access in various scenarios such as initial access, radio link re-establishment, uplink synchronization, handover, etc. The base station may configure parameters associated with a random access procedure such as preamble sequences, random access occasions (e.g., time/frequency resources), and the like. The base station may broadcast the random access configuration in a system information message such as a remaining minimum system information (RMSI) message.

The UEs may begin the random access procedure by transmitting a random access preamble at a configured random access occasion. Prior to transmitting the preamble, the UE may perform a listen-before-talk (LBT) procedure, such as a category 4 (CAT4) LBT, to acquire or reserve a channel in a shared spectrum. A CAT4 LBT refers to an LBT with a random backoff and a variable contention window. However, this may be inefficient since the preamble can be as short as several OFDM symbols, and thus a CAT4 LBT may be too costly for such a short channel access transmission. In this regard, a UE may share its COT (e.g., UE-acquired COT) with other UEs attempting to perform random access. Thus, the other UEs may perform a shortened LBT procedure (e.g., CAT1 or CAT2) prior to transmitting the preamble. It is noted that UE-to-UE COT sharing may be beneficial for other types of uplink transmissions as well. Accordingly, techniques for supporting UE-to-UE COT sharing in the shared spectrum are described in detail below.

Figure 2:
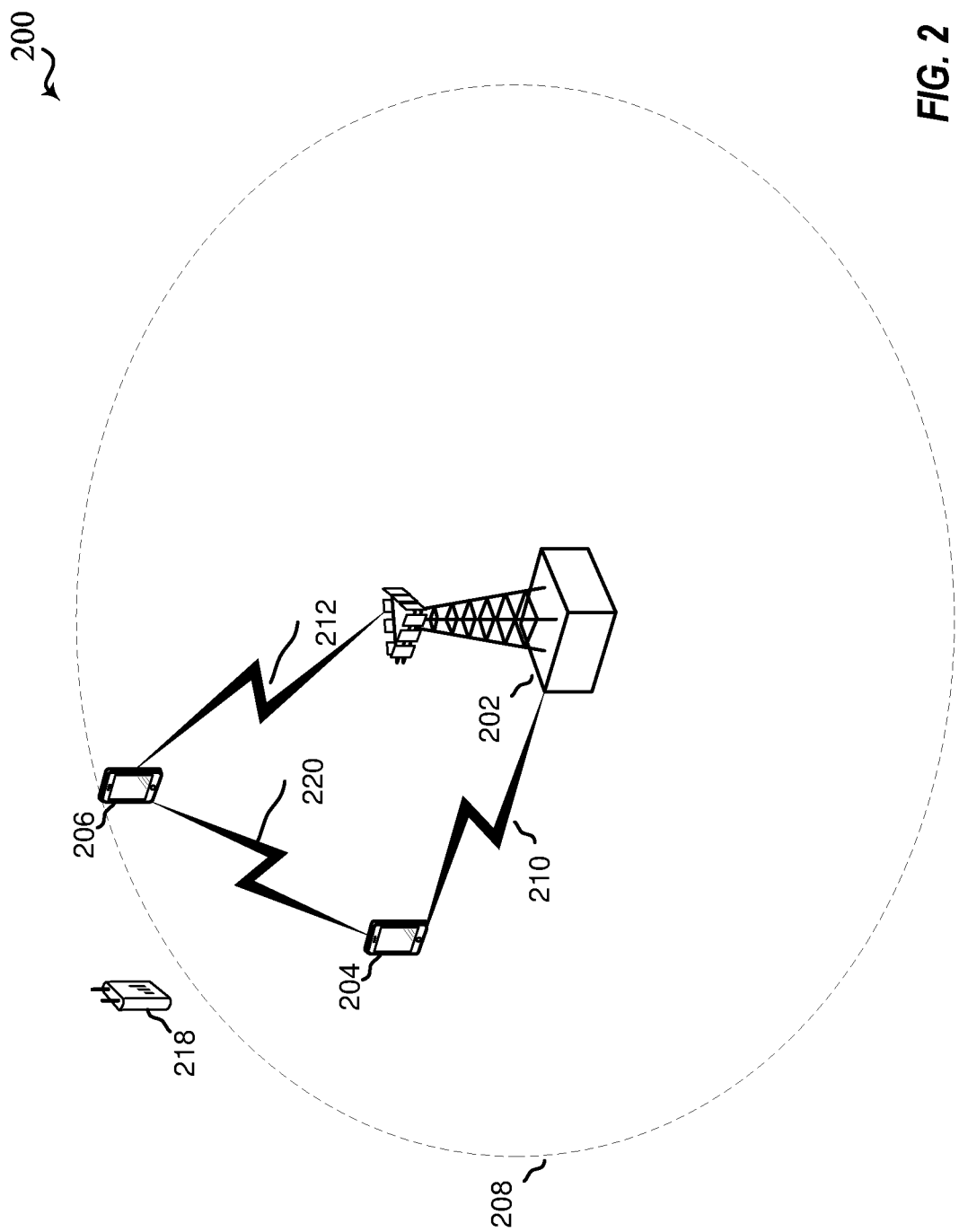
FIG. 2 illustrates an example of a system for supporting UE-to-UE channel occupancy time (COT) sharing in a shared spectrum in accordance with aspects of the present disclosure.

FIG. 2 illustrates a diagram of a system 200 for supporting UE-to-UE COT sharing in a shared spectrum. In some examples, the system 200 may be deployed as an NR system operating in TDD over a shared spectrum, which may include shared frequency bands, such as, for example, unlicensed frequency bands. The NR system operating in the unlicensed spectrum may be referred to as an NR-U system. For example, the system 200 may include a base station 202 (e.g., base station 105 in FIG. 1) and UEs 204 and 206 (e.g., UE 115 in FIG. 1) communicating 210, 212 within a coverage area 208. It is noted that the system 200 may be deployed with many more base stations and UEs communicating in multiple coverage areas, and that one base station and two UEs are described in FIG. 2 for the sake of simplicity and ease of discussion.

One approach to avoiding collisions when communicating in the shared spectrum or an unlicensed spectrum is to use an LBT procedure (or clear channel assessment (CCA) procedure) to ensure that the medium is clear before transmitting. For example, the base station 202 may acquire or reserve a COT in the shared spectrum by performing CAT4 LBT. In this regard, the COT may be referred to as a base station-acquired COT. The duration of the COT associated with a CAT4 LBT may be 6 ms, 8 ms, or 10 ms. When the CAT4 LBT passes or is successful, the base station 202 may perform a downlink (DL) transmission to UEs 204 and 206. The DL transmission may include downlink signals/channels such as discovery reference signal (DRS), synchronization signal block (SSB), demodulation reference signal (DM-RS), physical broadcast channel (PBCH), physical downlink control channel (PDCCH), physical downlink shared channel (PDSCH), and the like.

In one scenario, the UE 204 may receive an uplink grant transmitted via a PDCCH for scheduling the UE 204 for an uplink (UL) transmission within the base station-acquired COT. The UL transmission may include uplink signals/channels such as physical uplink control channel (PUCCH), physical uplink shared channel (PUSCH), physical random access channel (PRACH), sounding reference signal (SRS), scheduling request (SR), and the like. The UE 204 may determine a type or category LBT procedure to perform after the DL transmission. Here, the UE 204 may make this determination based on a duration of a gap between the DL transmission and the scheduled UL transmission. In other words, the gap may be defined from the end of the DL transmission to the beginning of the scheduled UL transmission. In some examples, the UE 204 may perform a CAT1 LBT if the gap is less than 16 μs. In some other examples, the UE 204 may perform a CAT2 LBT procedure if the gap is more than 16 μs but does not exceed 25 μs. It is noted that the type or category LBT disclosed herein are some examples and may depend on the local regulations and laws associated with devices operating in the shared spectrum.

In another scenario, the UE 204 may receive an uplink grant scheduled outside of the base station-acquired COT. In this regard, the UE 204 may perform a CAT4 LBT procedure to reserve or acquire another COT for the scheduled UL transmission.

In other scenarios, the UE 206 may attempt to perform a random access procedure within the base-station acquired COT. The UE 206 may receive a configuration for the random access procedure in a system information message via the PBCH. The configuration may include preamble sequences and random access occasions (e.g., time/frequency resources) for transmitting the preamble. Here, the UE 206 may determine that a random access occasion occurs within the base station-acquired COT. Accordingly, the UE 206 may perform a CAT1 or CAT2 LBT prior to transmitting the preamble. However, the UE 206 may be located at an edge of the coverage area 208, and may experience interference from a node 218. The node 218 may be considered hidden from the base station 202 since the node 210 may not have heard the base station 202 reserve or acquire the COT. Thus, the interference may cause the LBT procedure of the UE 206 to fail. As such, the UE 206 may have to wait until the next random access occasion to attempt random access again.

As previously noted, it may be desirable to enable UE-to-UE COT sharing for the random access procedure. For example, the UE 204 may reserve or acquire a COT by performing a CAT4 LBT procedure. This may be referred to as a UE-acquired COT. The CAT4 LBT procedure may be performed before a random access occasion. If the CAT4 LBT passes or is successful, the UE 204 may send a signal 220 declaring the UE-acquired COT is being shared with other UEs who may want to perform random access. The node 218 may not be hidden from the UE 204 since the transmission of UE 204 may be detected by the node 218. Therefore, the node 218 may determine that the medium is busy and may refrain from transmitting during the UE-acquired COT. The UE 206 may receive the signal 220 and determine that the UE-acquired COT is being shared for random access. Accordingly, the UE may perform a CAT1 or CAT2 LBT prior to transmitting the preamble at the random access occasion within the UE-acquired COT.

Although UE-to-UE COT sharing has been described in assisting the random access procedure, it is understood that UE-to-UE COT sharing may also help in other usage scenarios as will be evident from the detailed description that follows below.

Figure 3:
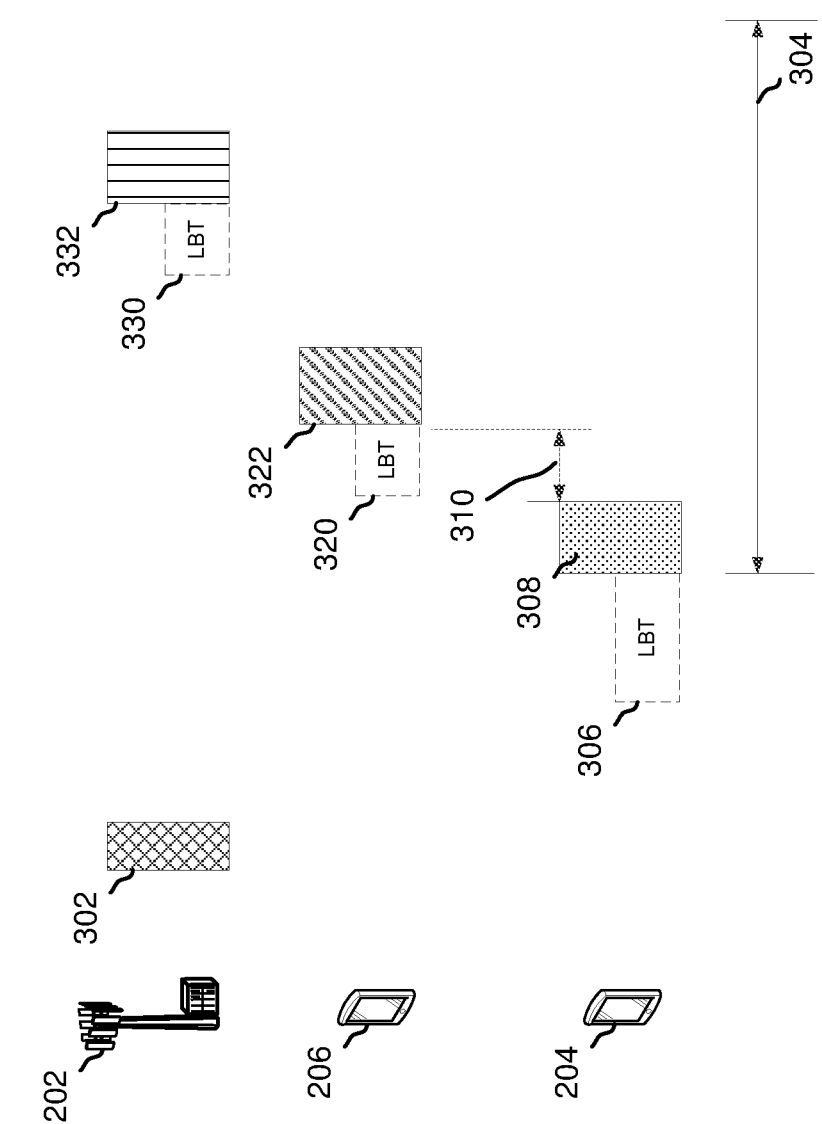
FIG. 3 illustrates a flow diagram of a system for supporting UE-to-UE COT sharing for a random access procedure in accordance with aspects of the present disclosure.

FIG. 3, illustrates a flow diagram of a system 300 for supporting UE-to-UE COT sharing in a shared spectrum. The system 300 may be similar to the system 200 described in FIG. 2, and thus may use the same reference numbers for ease of discussion. In an aspect, the system 300 may include a base station 202 (e.g., base station 105 in FIG. 1) and UEs 204 and 206 (e.g., UE 115 in FIG. 1) communicating in a shared spectrum. The base station 202 may configure the UE 204 to function as a random access helper (RACH helper). In an aspect, a RACH helper may assist other UEs who desire to perform random access at the configured random access occasions. This this regard, the RACH helper may acquire a COT that includes one or more random access occasions. Accordingly, the UE's may perform a shortened LBT procedure (e.g., CAT1 or CAT 2 LBT) instead of an extended LBT procedure (e.g., CAT4 LBT) prior to transmitting an initial random access transmission at the configured random access occasion. In an example, the base station 202 may transmit a configuration 302 via a radio resource control (RRC) message. The configuration may be associated with a configured grant. In an aspect, the configured grant may be an allocation of resources via the RRC message for autonomous uplink (AUL) transmission. The AUL transmission may also be referred to as grant-free or grant-less uplink transmission. In another aspect, the configured grant may be via semi-persistent scheduling (SPS). The base station 202 may provide uplink resources for the configured grant, which may be based on when the random access occasions occur. In another example, the base station 202 may transmit the configuration 302 via a downlink control information (DCI) message. Accordingly, the UE 204 may be dynamically triggered via the DCI to function as a RACH helper. The DCI message may be associated with a scheduled grant (e.g., scheduled uplink (SUL)). The scheduled grant may also be referred to as an uplink grant allocated in the DCI message. For example, the DCI message may allocate uplink resources for an uplink transmission via a PUSCH or PUCCH. The base station 202 may allocate uplink resources for the scheduled grant, which may be based on when the random access occasions occur.

The configuration 302 may inform the UE 204 that the UE 204 can share its COT with other UEs. Additionally, the configuration 302 may indicate various operating parameters to use for the UE-acquired COT, such as, a type of LBT priority class (e.g., CAT1, CAT2, etc.), a duration of the COT, a type of multiplexing scheme (e.g., time division multiplexing (TDM), frequency division multiplexing (FDM), or spatial division multiplexing (SDM)), and the like. In an example, the base station 202 may configure the UE 204 to share a remaining portion of its COT in a TDM manner. In another example, the base station 202 may configure the UE 204 to share one or more component carriers or bandwidth parts within its COT in an FDM manner. It is noted that FDM may be achieved using different interlaces for the uplink transmissions. In other examples, the base station 202 may configure the UE 204 to share its COT in an SDM manner. In this regard, the base station 202 may specify DM-RS ports and/or DM-RS sequence for one or more layers of the uplink transmissions.

As previously noted, the UE 204 may function as a RACH helper using UE-to-UE COT sharing. In one aspect, the UE 204 may assist in a 4-step random access procedure which may involve: 1) a random access preamble (e.g., Msg1) transmitted from a UE to a base station; 2) a random access response (e.g., Msg2) transmitted from the base station to UE, which may include an uplink grant; 3) a first scheduled message (e.g., Msg3) transmitted, in accordance with the uplink grant, from the UE to the base station; and 4) contention resolution message transmitted from the base station to the UE (e.g., Msg4). The base station 202 may configure random access occasions for transmission of Msg1.

In another aspect, the UE 204 may assist in a 2-step random access procedure which may involve: 1) message A (e.g., combination of Msg1 and Msg3) transmitted from a UE to a base station; and 2) message B (e.g., combination of Msg2 and Msg4) transmitted from the base station to the UE. The base station 202 may configure one or more PUSCH occasions for transmission of message A.

The UE 204 may reserve or acquire a COT 304 by performing a CAT4 LBT procedure 306. This may be referred to as a UE-acquired COT. The CAT4 LBT procedure 306 may be performed before a random access occasion 322. In some examples, more than one random access occasion may occur within the UE-acquired COT 304. If the CAT4 LBT 306 passes or is successful, the UE 204 may send a signal 308 declaring the UE-acquired COT 304 is being shared with other UEs who may want to perform random access. In an aspect, the UE 204 may transmit the signal 308 via a broadcast channel. In another aspect, the UE 204 may transmit the signal 308 via an uplink control information (UCI) in the PUCCH or PUSCH. The UCI may be associated with a configured grant or a scheduled grant. In another aspect, the UE 204 may transmit the signal 308 via a D2D communication.

In some examples, the signal 308 may also inform the other UEs the type of LBT priority class (e.g., CAT1, CAT2, etc.) associated with the COT 304. In some other examples, the signal 308 may include a duration of the COT 304 or a remaining duration of the COT 304 after transmission of the signal 308. In other examples, the signal 308 may indicate the type of multiplexing scheme (e.g., TDM, FDM, or SDM) to use within the COT 304.

The UE 206 may receive the signal 308 and determine that the UE-acquired COT 304 is being shared. Accordingly, the UE 206 may perform a shortened LBT procedure 320 prior to transmitting a preamble (e.g., Msg1 of the 4-step random access procedure) at the random access occasion 322. In another aspect, the UE 206 may transmit a message A of the 2-step random access procedure at a PUSCH occasion (e.g., random access occasion 322). It is noted that the UE 204 may provide a time gap (or resources) 310 between the signal 308 and the random access occasion 322 to allow for sufficient time for performing the LBT procedure 320 if needed. In other words, the UE 204 may end its uplink transmission (e.g., signal 308) to provide sufficient time for the UE 206 to perform the LBT procedure. In some examples, the UE 206 may perform a CAT1 LBT (or no LBT) if the gap 310 is less than 16 µs. In some other examples, the UE 206 may perform a CAT2 LBT (or one shot LBT) if the gap 310 is more than 16 µs but does not exceed 25 µs. It is noted that the type or category LBT disclosed herein are some examples and may depend on local regulations and laws associated with devices operating in the shared spectrum.

In some scenarios, the base station 202 may take over a remaining duration of the COT 304 after the random access occasion 322 to transmit a random access response 332 (e.g., Msg2 of the 4-step random access procedure). In this regard, the base station 202 may perform a CAT1 or CAT2 LBT procedure 330, and if successful, may transmit the random access response 332 within the COT 304. In another aspect, the base station 202 may transmit a message B of the 2-step random access procedure (e.g., random access response 332).

It is noted that although one random access occasion 322 is shown within the UE-acquired COT 304, there may be scenarios where more than one random access occasions occur close to each other. Accordingly, the COT 304 may include multiple random access occasions. Additionally, the UE 204 may perform an uplink transmission before each random access occasion that follows the first random access occasion 322 in order to occupy the COT 304 and prevent other devices from jumping in and acquiring the shared spectrum.

Figure 4:
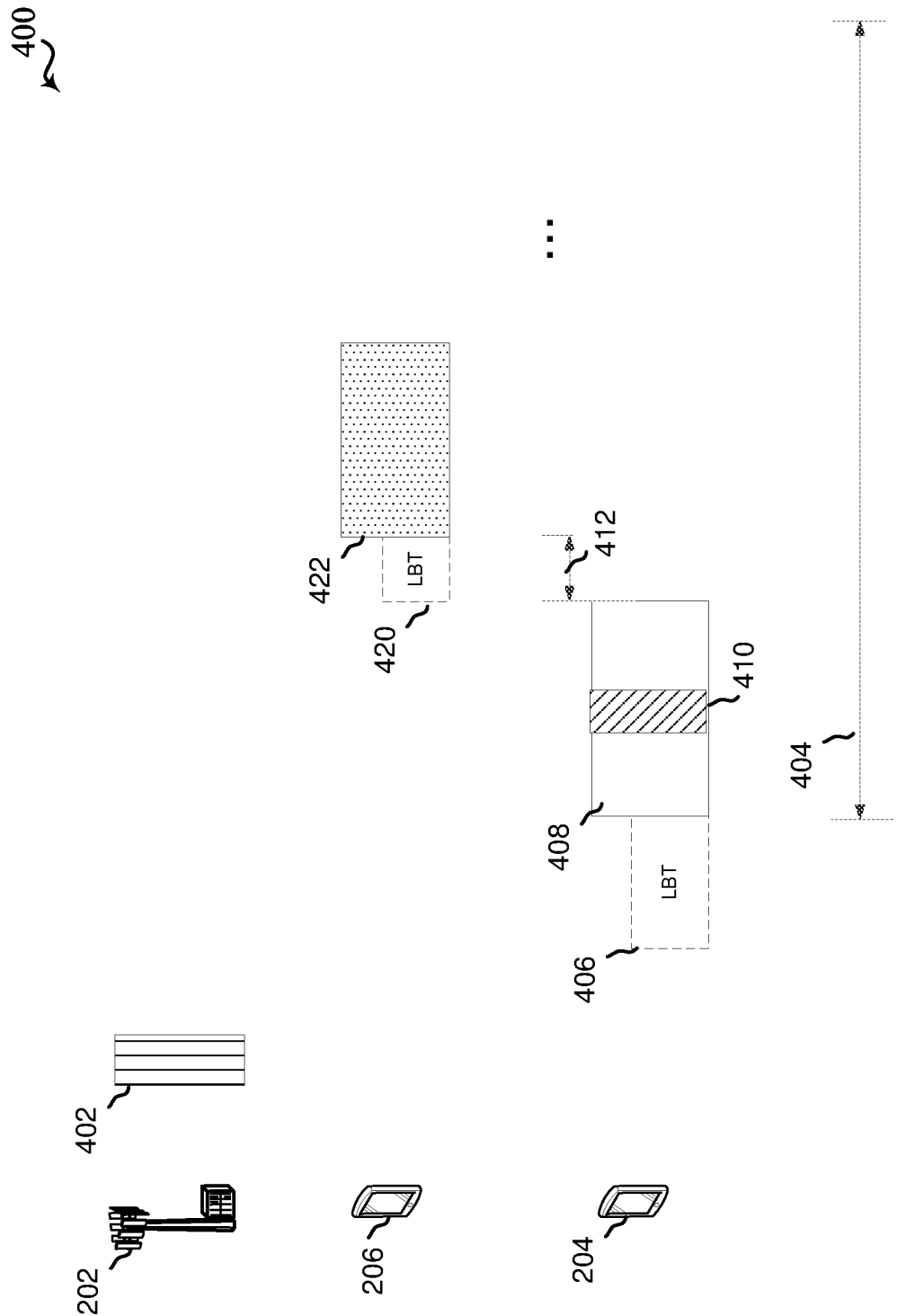
FIG. 4 illustrates a flow diagram of a system for supporting UE-to-UE COT sharing for uplink transmissions in accordance with aspects of the present disclosure.

FIG. 4 illustrates a flow diagram of a system 400 for supporting UE-to-UE COT sharing in a shared spectrum. The system 400 may be similar to the systems 200, 300 described in FIGS. 2 and 3, respectively, and thus may use the same reference numbers for ease of discussion. In an aspect, the system 400 may include a base station 202 (e.g., base station 105 in FIG. 1) and UEs 204 and 206 (e.g., UE 115 in FIG. 1) communicating in a shared spectrum. The base station 202 may configure the UE 204 to function as an uplink helper. In this regard, the UE 204 may acquire a COT to assist other UEs' uplink transmission. In an example, the base station 202 may transmit a configuration 402 to the UE 204 via a radio resource control (RRC) message. The configuration 402 may be associated with a configured grant (e.g., AUL). The base station 202 may allocate uplink resources for the configured grant, which may be based on an allocation of another UE's (e.g., UE 206) configured grant or schedule grant. In another example, the base station 202 may send the configuration 402 via a downlink control information (DCI) message. Accordingly, the UE 204 may be dynamically triggered via the DCI to function as an uplink helper. The DCI message may be associated with a scheduled grant (e.g., SUL). The base station 202 may allocate uplink resources for the scheduled grant, which may be based on an allocation of another UE's (e.g., UE 206) configured grant or scheduled grant.

The configuration 402 may inform the UE 204 that the UE 204 can share its COT with other UEs. Additionally, the configuration 402 may indicate various operating parameters to use for the UE-acquired COT, such as, a type of LBT priority class (e.g., CAT1, CAT2, etc.), a duration of the COT, a type of multiplexing scheme (e.g., TDM, FDM, or SDM), and the like. In an example, the base station 202 may configure the UE 204 to share a remaining portion of its COT in a TDM manner. In another example, the base station 202 may configure the UE 204 to share one or more component carriers or bandwidth parts within its COT in an FDM manner. It is noted that FDM may also be achieved using different interlaces for the uplink transmissions. In other examples, the base station 202 may configure the UE 204 to share its COT in an SDM manner. In this regard, base station 202 may specify DM-RS ports and/or DM-RS sequence for one or more spatial layers of the uplink transmissions.

The UE 204 may reserve or acquire a COT 404 by performing a CAT4 LBT procedure 406. This may be referred to as a UE-acquired COT. The CAT4 LBT procedure 406 may be performed before a configured or scheduled grant 422 of UE 206. If the CAT4 LBT 406 passes or is successful, the UE 204 may send control and/or data signal 408 via a PUCCH or PUSCH in accordance with its own configured grant or scheduled grant. Additionally, the UE 204 may multiplex a signal 410 with the control and/or data signal 408. The signal 410 may declare the UE-acquired COT 404 is being shared with other UEs who may have a configured or scheduled grant within the COT 404. In some examples, the signal 410 may also provide a type of LBT priority class (e.g., CAT1, CAT2, etc.) associated with the COT 404. In some other examples, the signal 410 may include a duration of the COT 304 or a remaining duration of the COT 404 after transmission of the control and/or data signal 408. In other examples, the signal 410 may indicate the type of multiplexing scheme (e.g., TDM, FDM, or SDM) to use within the COT 404. In an aspect, the UE 204 may transmit the signal 410 via an uplink control information (UCI) in the PUCCH or PUSCH.

The UE 206 may receive the signal 410 and determine that the UE-acquired COT 404 is being shared. Accordingly, the UE 206 may perform a shortened LBT procedure 420 prior to transmitting control and/or data at an allocated uplink resource 422 in accordance with a configured grant. In another aspect, the UE 206 may transmit control and/or data at an allocated uplink resource 422 in accordance with a scheduled grant. It is noted that the UE 204 may provide a gap (or resources) 412 between the signal 408 and the configured or scheduled grant 422 to allow for sufficient time for performing the LBT 412 if needed. That is, the UE 204 may end its uplink transmission (e.g., signal 408) to provide sufficient time for the UE 206 to perform the LBT procedure. In some examples, the UE 206 may perform a CAT1 LBT (or no LBT) if the gap 412 is less than 16 μs. In some other examples, the UE 206 may perform a CAT2 LBT (or one shot LBT) if the gap 412 is more than 16 μs but does not exceed 25 μs. It is noted that the type or category LBT disclosed herein are some examples and may depend on local regulations and laws associated with devices operating in the shared spectrum.

In some scenarios, the UE 204 may take back a remaining portion of the COT 404 if the transmission 422 of the UE 206 is completed before the end of the COT 404. Accordingly, the UE 204 may perform another uplink transmission (not shown) with a shortened LBT procedure if the gap is within a threshold as was described above with respect to the gap 412 between the transmissions.

It is noted that although one configured or scheduled grant 422 is shown within the COT 404, it is understood that the COT 404 may include multiple configured or scheduled grants for the same UE or for different UEs.

Figure 5:
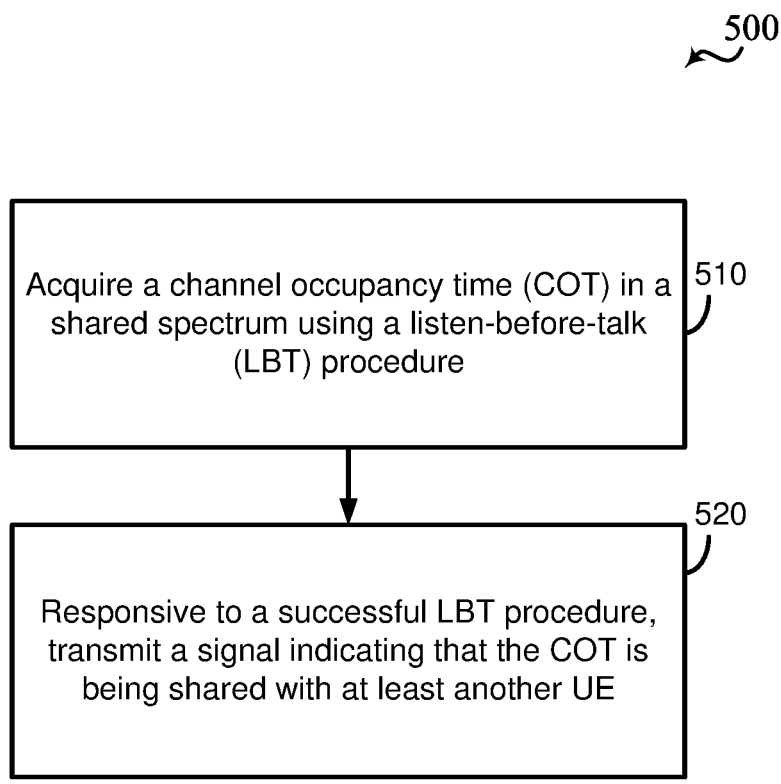
FIGS. 5-7 illustrate block flow diagrams of methods for supporting UE-to-UE COT sharing in a shared spectrum in accordance with aspects of the present disclosure.
Figure 6:
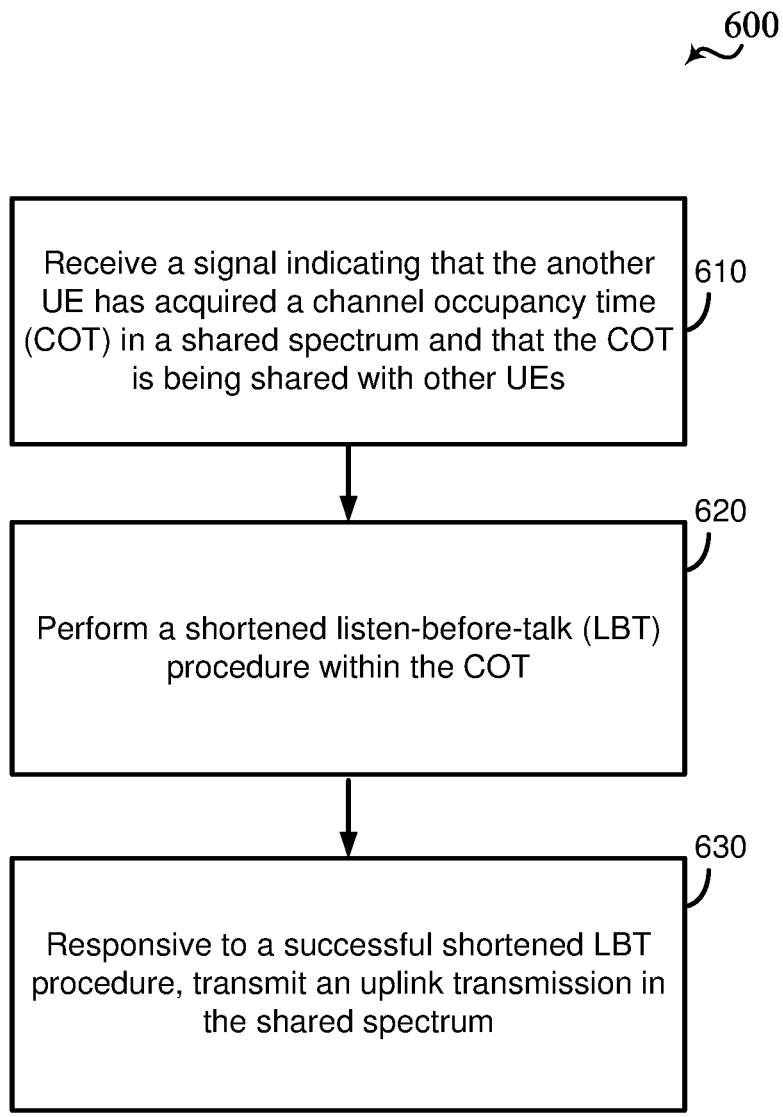
Figure 7:
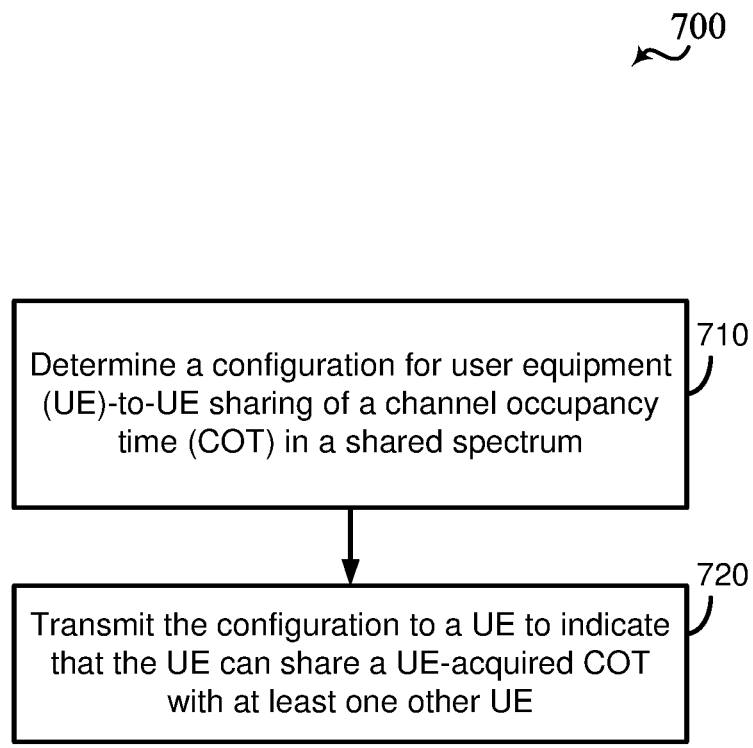

FIGS. 5-7 illustrate block flow diagrams of methods for supporting UE-to-UE COT sharing in a shared spectrum in accordance with the present disclosure. The methods of FIGS. 5-7 may be described with reference to FIGS. 2-4 and may use the same reference numerals for ease of discussion.

In FIG. 5 a method 500 for supporting UE-to-UE COT sharing in a shared spectrum is provided. The operations of the method 500 may be implemented by a UE 115, 204, 206 or its components as described herein with reference to FIGS. 11-12. In some examples, a UE 115, 204, 206 may execute a set of codes to control the functional elements of the device to perform the functions described below. Additionally or alternatively, the UE 115, 204, 206 may perform aspects of the functions described below using special-purpose hardware.

At block 510, a UE 115, 204, 206 may acquire a channel occupancy time (COT) in a shared spectrum using a listen-before-talk (LBT) procedure. The operations of block 510 may be performed according to the methods described herein. In some examples, the UE may perform a CAT 4 LBT to acquire the COT for a duration of time. The COT may be referred to as a UE-acquired COT. In an aspect, the UE-acquired COT may be associated with a configured grant (e.g., AUL). In another aspect, the UE-acquired COT may be associated with a scheduled grant (e.g., SUL).

At block 520, the UE 115, 204, 206 may, responsive to a successful LBT procedure, transmit a signal indicating that the COT is being shared with at least another UE. The operations of block 510 may be performed according to the methods described herein. In some examples, the UE may receive a configuration from a serving base station that the UE may function as a RACH helper (as described in FIG. 3) or uplink helper (as described in FIG. 4) using UE-to-UE COT sharing. The UE may receive the configuration via an RRC message or a DCI message. Accordingly, the UE may signal to the other UEs an LBT priority class associated with the UE-acquired COT. In an aspect, the LBT priority class associated with the UE-acquired COT may be a CAT1 or CAT2 LBT procedure. Accordingly, the UEs who would like to transmit within another UE's COT are made aware of the LBT priority class associated with the COT. It is noted that the UE may provide a time gap within its COT for the other UEs to perform the shortened LBT procedure for the random access preamble or the configured/scheduled grant.

In some other examples, the signal may comprise a duration of the UE-acquired COT. The duration of the COT (may be referred to as the maximum channel occupancy time (MCOT)) may depend on the LBT priority class that was used to acquire the COT. More specifically, the duration of the COT associated with a CAT4 LBT may be 6 ms, 8 ms, or 10 ms. Accordingly, the UEs who would like to transmit within another UE's acquired COT are made aware of when the COT ends.

In some examples, the signal may indicate a multiplexing scheme to use within the COT. The multiplexing scheme may include a TDM, FDM, or SDM.

In other examples, the UE may transmit the signal via a broadcast channel. In some other examples, the UE may transmit the signal via a UCI message in the PUCCH or PUSCH. In still other examples, the UE may transmit the signal via a D2D communication.

In FIG. 6, a method 600 for supporting UE-to-UE COT sharing in a shared spectrum is provided. The operations of the method 600 may be implemented by a UE 115, 204, 206 or its components as described herein with reference to FIGS. 11-12. In some examples, a UE 115, 204, 206 may execute a set of codes to control the functional elements of the device to perform the functions described below. Additionally or alternatively, the UE 115, 204, 206 may perform aspects of the functions described below using special-purpose hardware.

At block 610, a UE 115, 204, 206 may receive a signal from another UE indicating that it has acquired a channel occupancy time (COT) in a shared spectrum and that the COT is being shared with one or more UEs. The operations of block 610 may be performed according to the methods described herein. In some examples, the signal may comprise an LBT priority class associated with the COT. In an aspect, the LBT priority class associated with the UE-acquired COT may be a CAT1 or CAT2 LBT procedure. In some other examples, the signal may comprise a duration of the UE-acquired COT or a remaining duration of the COT after the first uplink transmission. The duration of the COT may depend on the LBT priority class that was used to acquire the COT. In still other examples, the signal may comprise a multiplexing scheme to use within the COT. The multiplexing scheme may include a TDM, FDM, or SDM.

In some examples, the UE may receive the signal via a broadcast channel. In other examples, the UE may receive the signal via a UCI message in a PUCCH or PUSCH. In some other examples, the UE may receive the signal via a D2D communication.

At block 620, the UE 115, 204, 206 may perform a shortened LBT procedure within the COT. The operations of block 620 may be performed according to the methods described herein. In some examples, the UE may perform a CAT1 or CAT2 within the COT in accordance with the signal received in block 610. The type of LBT to use may depend on a time gap (e.g., gap 310 in FIG. 3 or gap 412 in FIG. 4). The shortened LBT procedure (e.g., CAT1 or CAT2)

may be performed instead of an extended LBT procedure (e.g., CAT4) because it occurs within the UE-acquired COT.

At block 630, the UE 115, 204, 206 may, responsive to a successful shortened LBT procedure, transmit an uplink transmission in the shared spectrum. The operations of block 420 may be performed according to the methods described herein. In some examples, the UE may perform an initial transmission associated with a random access procedure in response to a successful CAT1 or CAT2 LBT procedure. In an aspect, the UE may transmit a random access preamble associated with a 4-step random access procedure. In another aspect, the UE may transmit a message A associated with a 2-step random access procedure.

In FIG. 7, a method 700 for supporting UE-to-UE COT sharing in a shared spectrum is provided. The operations of the method 700 may be implemented by a base station 105, 202 or its components as described herein with reference to FIGS. 9-10. In some examples, a base station 105, 202 may execute a set of codes to control the functional elements of the device to perform the functions described below. Additionally or alternatively, the base station 105, 202 may perform aspects of the functions described below using special-purpose hardware.

At block 710, a base station 105, 202 may determine a configuration for UE-to-UE sharing of a channel occupancy time (COT) in a shared spectrum. The operations of block 710 may be performed according to the methods described herein. In some examples, the base station may configure a UE to function as a RACH helper (e.g., UE 204 in FIG. 3) or an uplink helper (e.g., UE 204 in FIG. 4). The configuration may inform the UE that the UE can share its COT with other UEs. Additionally, the configuration may indicate various operating parameters to use for the UE-acquired COT, such as, a type of LBT priority class, a duration of the COT, a type of multiplexing scheme, and the like.

At block 720, the base station 105, 202 may transmit the configuration to indicate that a UE can share a UE-acquired COT with at least another UE. The operations of block 720 may be performed according to the methods described herein. In some examples, the base station may transmit the configuration via an RRC message. In some other examples, the base station may transmit the configuration via a DCI message. The DCI message may be transmitted to a specific UE or may be transmitted to a group of UEs using a group common DCI message (e.g., GC-PDCCH).

In an aspect, the base station may receive an initial transmission associated with a random access procedure within the UE-acquired COT. Accordingly, the base station may perform a shortened LBT procedure within the UE-acquired COT, and if the shortened LBT procedure is successful, may transmit a response to the initial random access transmission. In an example, the base station may transmit a random access response (e.g., Msg2) associated with a 4-step random access procedure. In another example, the base station may transmit a message B associated with a 2-step random access procedure.

Figure 8:
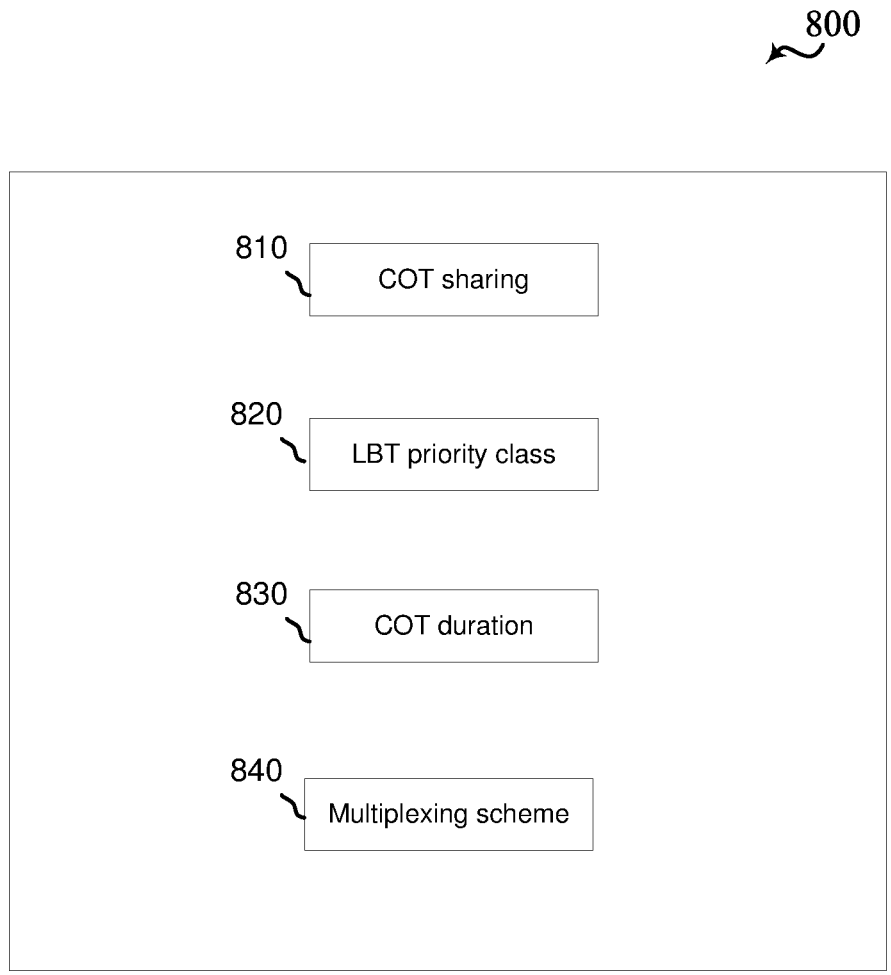
FIG. 8 illustrates a block diagram of operating parameters for supporting UE-to-UE COT sharing in a shared spectrum in accordance with aspects of the present disclosure.

FIG. 8 illustrates a block diagram of operating parameters 800 for supporting UE-to-UE COT sharing in a shared spectrum. In an aspect, the operating parameters 800 may be provided by a base station (e.g., base station 202 in FIGS. 3-4) for configuring its served UEs to function as a RACH helper (e.g., UE 204 in FIG. 3) or as an uplink helper (e.g., UE 204 in FIG. 4). In another aspect, the operating parameters 800 may be provided by a UE (e.g., UE 204 in FIGS. 3-4) who is configured to share its own COT with other UEs (e.g., UE 206 in FIGS. 3-4). In some examples, the operating parameters 800 may include an indication 810 of whether UE-to-UE COT sharing is enabled or disabled.

In other examples, the operating parameters 800 may include a type of LBT priority class 820 associated with the UE-acquired COT. In an aspect, the type of LBT priority class 820 may indicate whether a CAT1 or CAT2 LBT procedure may be used within the UE-acquired COT. In another aspect, the type of LBT priority class 820 may be based on a time gap between transmissions.

In some other examples, the operating parameters 800 may include a duration of the COT 830. In an aspect, the duration of the COT 830 may indicate a maximum channel occupancy time (MCOT). More specifically, the MCOT associated with a CAT4 LBT procedure may be 6 ms, 8 ms, or 10 ms. In another aspect, the duration of the COT 830 may indicate a remaining duration of the COT after the first uplink transmission within the COT.

In still other examples, the operating parameters 800 may include a type of multiplexing scheme 840 to use within the UE-acquired COT. In an example, the type of multiplexing scheme 840 may indicate that the UE-acquired COT may be shared in a TDM manner. In another example, the type of multiplexing scheme 840 may indicate that one or more component carriers or bandwidth parts may be shared within the UE-acquired COT in an FDM manner. It is noted that FDM may be achieved using different interlaces for the uplink transmissions. In other examples, the type of multiplexing scheme 840 may indicate that the UE-acquired COT may be shared in an SDM manner. In this regard, the DM-RS ports and/or DM-RS sequence may be specified for the plurality of spatial layers.

It is noted that the base station and/or UE may not provide all the operating parameters 800 described above. For example, one or more of the operating parameters 800 may be provided via explicit signaling and one or more of the operating parameters 800 may be determined implicitly based on the type of UE-to-UE COT sharing that is configured.

Figure 9:
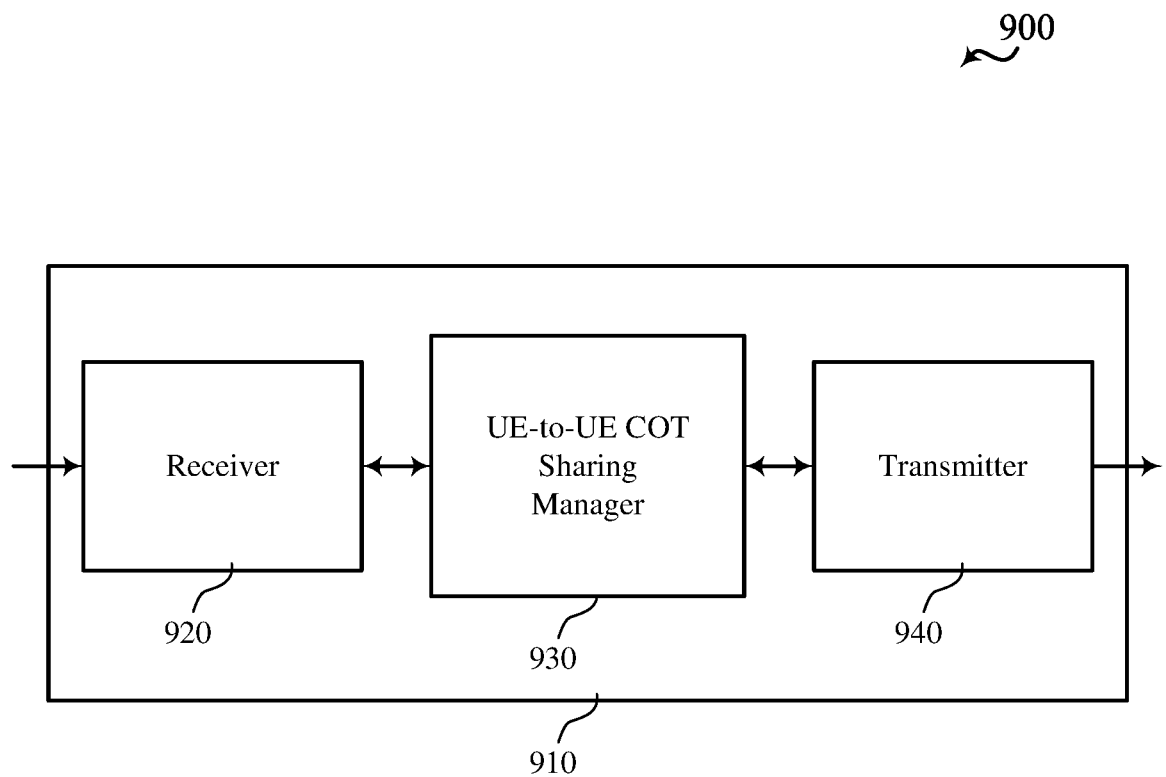
FIG. 9 illustrates a block diagram of a device that supports UE-to-UE COT sharing in a shared spectrum in accordance with aspects of the present disclosure.

FIG. 9 shows a block diagram 900 of a wireless device 910 that supports UE-to-UE COT sharing in a shared spectrum in accordance with aspects of the present disclosure. Wireless device 910 may be an example of aspects of a base station 105, 202 as described herein. Wireless device 910 may include a receiver 920, UE-to-UE COT sharing manager 930, and transmitter 940. Wireless device 910 may also include a processor. Each of these components may be in communication with one another (e.g., via one or more buses).

Receiver 920 may receive information such as packets, user data, or control information associated with various uplink channels such as PUCCH, PUSCH, PRACH, SRS, SR, and the like. Information may be passed on to other components of the device. The receiver 920 may be an example of aspects of the transceiver 1035 described with reference to FIG. 10. The receiver 920 may utilize a single antenna or a set of antennas.

The UE-to-UE COT sharing manager 930 may be an example of aspects of UE-to-UE COT sharing manager 1015 described with reference to FIG. 10.

The UE-to-UE COT sharing manager 930 and/or at least some of its various sub-components may be implemented in hardware, software executed by a processor, firmware, or any combination thereof. If implemented in software executed by a processor, the functions of the UE-to-UE COT sharing manager 930 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE-to-UE COT sharing manager 930 and/or at least some of its various sub-components may be physically located at various positions, including being distributed such that portions of functions are implemented at different physical locations by one or more physical devices. In some examples, the UE-to-UE COT sharing manager 930 and/or at least some of its various sub-components may be a separate and distinct component in accordance with various aspects of the present disclosure. In other examples, the UE-to-UE COT sharing manager 930 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE-to-UE COT sharing manager 930 may manage a configuration of a served UE with respect to UE-to-UE COT sharing as was described in FIGS. 3, 4, 7 and 8. In some examples, the UE-to-UE COT sharing manager 930 may be configured to determine a configuration for UE-to-UE sharing of a COT in a shared spectrum, and to transmit the configuration to one or more of its served UEs to indicate that it can share a UE-acquired COT with at least one other UE. In some aspects, the configuration may activate/deactivate UE-to-UE COT sharing. In some other aspects, the configuration may enable at least one of: TDM, FDM, or SDM for the UE-to-UE COT sharing.

In an aspect, the configuration may be transmitted via an RRC message. In another aspect, the configuration may be transmitted via a DCI message. In some example, the DCI message may be associated with a configured grant. In other examples, the DCI message may be associated with a scheduled grant. In some other examples, the DCI message may be sent in a group common downlink control channel (e.g., GC-PDCCH).

In some examples, the UE-to-UE COT sharing manager 930 may enable UE-to-UE COT sharing to help UEs attempting to perform random access as described herein. In some other examples, the UE-to-UE COT sharing manager 930 may enable UE-to-UE COT sharing to help UEs attempting to perform uplink transmission in accordance with a configured or scheduled grant.

Transmitter 940 may transmit signals generated by other components of the device. In some examples, the transmitter 940 may be collocated with a receiver 920 in a transceiver module. For example, the transmitter 940 may be an example of aspects of the transceiver 1035 described with reference to FIG. 10. The transmitter 940 may utilize a single antenna or a set of antennas.

Transmitter 940 may transmit information such as packets, user data, or control information associated downlink signals/channels such as such as DRS, SSB, DM-RS, PBCH, PDCCH, PDSCH, and the like. In some examples, the transmitter 940 may transmit the configuration for supporting UE-to-UE COT sharing as described herein.

Figure 10:
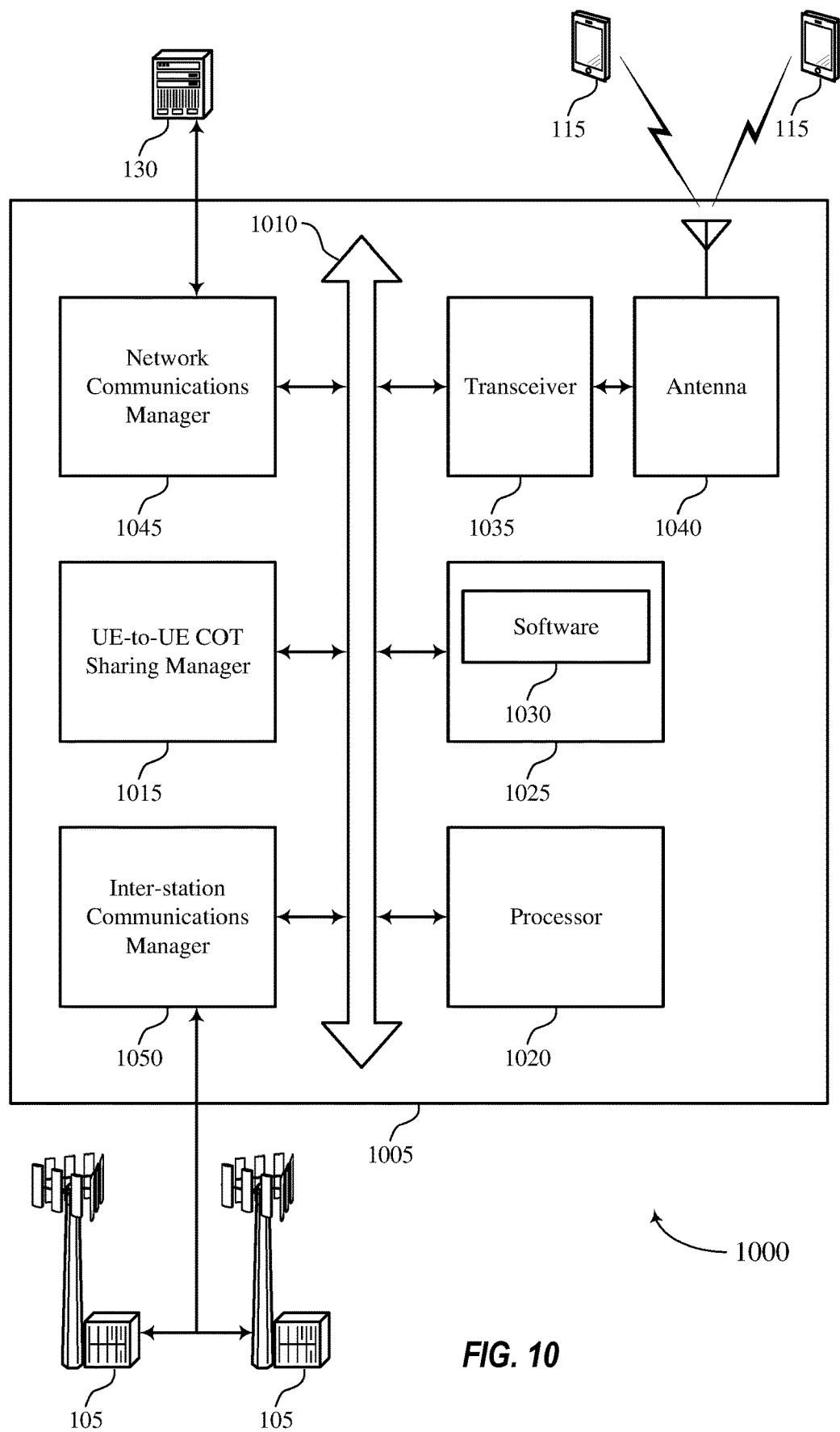
FIG. 10 illustrates a block diagram of a system including a base station that supports UE-to-UE COT sharing in a shared spectrum in accordance with aspects of the present disclosure.

FIG. 10 shows a diagram of a system 1000 including a device 1005 that supports UE-to-UE COT sharing in a shared spectrum in accordance with aspects of the present disclosure. Device 1005 may be an example of or include the components of wireless device 910 or a base station 105, 202 as described herein. Device 1005 may include components for bi-directional voice and data communications including components for transmitting and receiving communications, including slot format manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more user equipment (UE)s 115, 204, 206.

The UE-to-UE COT sharing manager 1015 may manage enabling/disabling UE-to-UE COT sharing as described in various aspects and examples herein. For examples, the UE-to-UE COT sharing manager may maintain configuration parameters and manage various procedures to support UE-to-UE COT sharing in a shared spectrum as described herein in FIGS. 3-4 and 7-8.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting UE-to-UE COT sharing a shared spectrum).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support long term channel sensing in a shared spectrum. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115, 204, 206.

Inter-station communications manager 1050 may manage communications with other base station 105, 202, and may include a controller or scheduler for controlling communications with UEs 115 in cooperation with other base stations 105, 202. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an NR wireless communication network technology to provide communication between base stations 105, 202.

Figure 11:
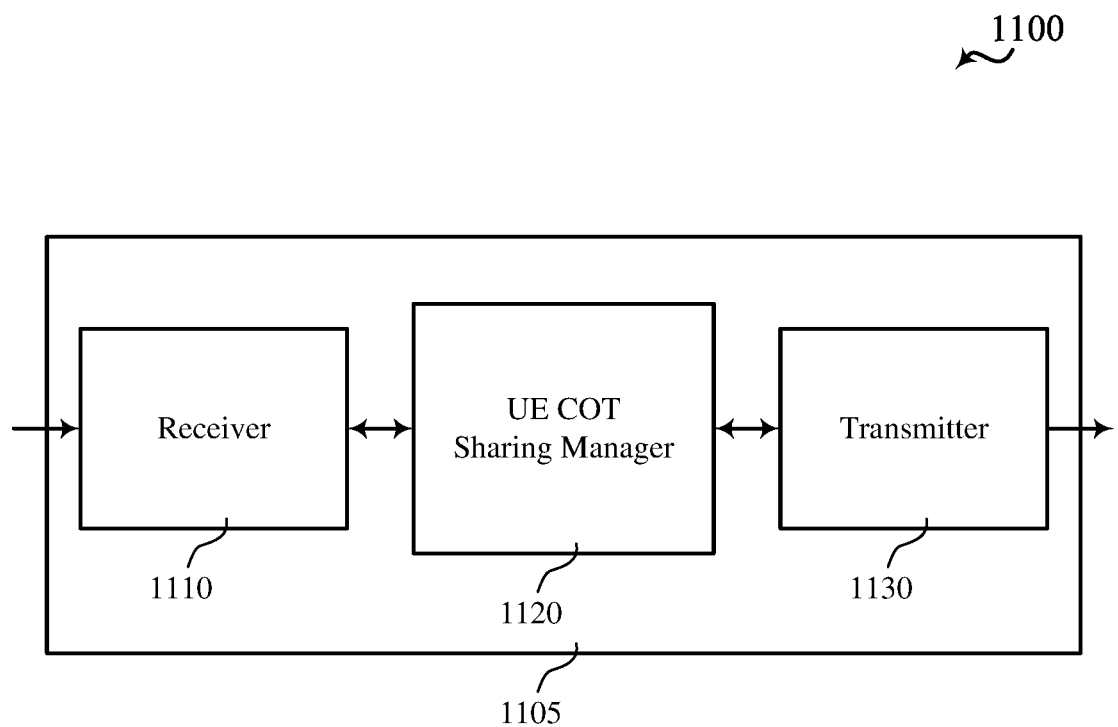
FIG. 11 illustrates a block diagram of a device that supports UE-to-UE COT sharing in a shared spectrum in accordance with aspects of the present disclosure.

FIG. 11 shows a block diagram 1100 of a wireless device 1105 that supports UE-to-UE COT sharing in a shared spectrum in accordance with aspects of the present disclosure. Wireless device 1105 may be an example of aspects of a UE 115, 204, 206 as described herein. Wireless device 1105 may include receiver 1110, UE COT sharing manager 1120, and transmitter 1130. Wireless device 1105 may also include a processor. Each of these components may be in communication with one another (e.g., via one or more buses).

Receiver 1110 may receive information such as packets, user data, or control information associated downlink signals/channels such as such as DRS, SSB, DM-RS, PBCH, PDCCH, PDSCH, and the like. Information may be passed on to other components of the device. The receiver 1110 may be an example of aspects of the transceiver 1235 described with reference to FIG. 12. The receiver 1110 may utilize a single antenna or a set of antennas.

The UE COT sharing manager 1120 may be an example of aspects of the UE COT sharing manager 1215 described with reference to FIG. 12.

The UE COT sharing manager 1120 and/or at least some of its various sub-components may be implemented in hardware, software executed by a processor, firmware, or any combination thereof. If implemented in software executed by a processor, the functions of the UE COT sharing manager 1120 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE COT sharing manager 1120 and/or at least some of its various sub-components may be physically located at various positions, including being distributed such that portions of functions are implemented at different physical locations by one or more physical devices. In some examples, UE COT sharing manager 1120 and/or at least some of its various sub-components may be a separate and distinct component in accordance with various aspects of the present disclosure. In other examples, the UE COT sharing manager 1120 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE COT sharing manager 1120 may manage and implement configuration parameters to support UE-to-UE COT sharing as described in FIGS. 3-6 and 8. In some examples, UE COT sharing manager 1120 may function as a RACH helper in a shared spectrum as described herein. In some other examples, the UE COT sharing manager 1120 may function as an uplink helper in a shared spectrum as described herein. Accordingly, the UE COT sharing manager 1120 may be configured to acquire COT in a shared spectrum using an LBT procedure, and responsive to a successful LBT procedure, to transmit a signal indicating that the COT is being shared with at least another UE.

In some other examples, the UE COT sharing manager 1120 be configured to receive a signal from another UE indicating that that it has acquired a COT in a shared spectrum and that the COT is being shared with other UEs, to perform a shortened LBT procedure within the COT, and responsive to a successful shortened LBT procedure, to transmit an uplink transmission in the shared spectrum. In an aspect, the uplink transmission may include an initial transmission associated with a random access procedure. In another aspect, the uplink transmission may include a configured grant (e.g., AUL). In yet another aspect, the uplink transmission may include a scheduled grant (e.g., SUL).

Transmitter 1130 may transmit signals generated by other components of the device. The transmitter 1130 may transmit information such as packets, user data, or control information associated with various uplink channels such as PUCCH, PUSCH, PRACH, SRS, SR, and the like. In some examples, the transmitter 1130 may be collocated with a receiver 1110 in a transceiver module. For example, the transmitter 1130 may be an example of aspects of the transceiver 1235 described with reference to FIG. 12. The transmitter 1130 may utilize a single antenna or a set of antennas.

Figure 12:
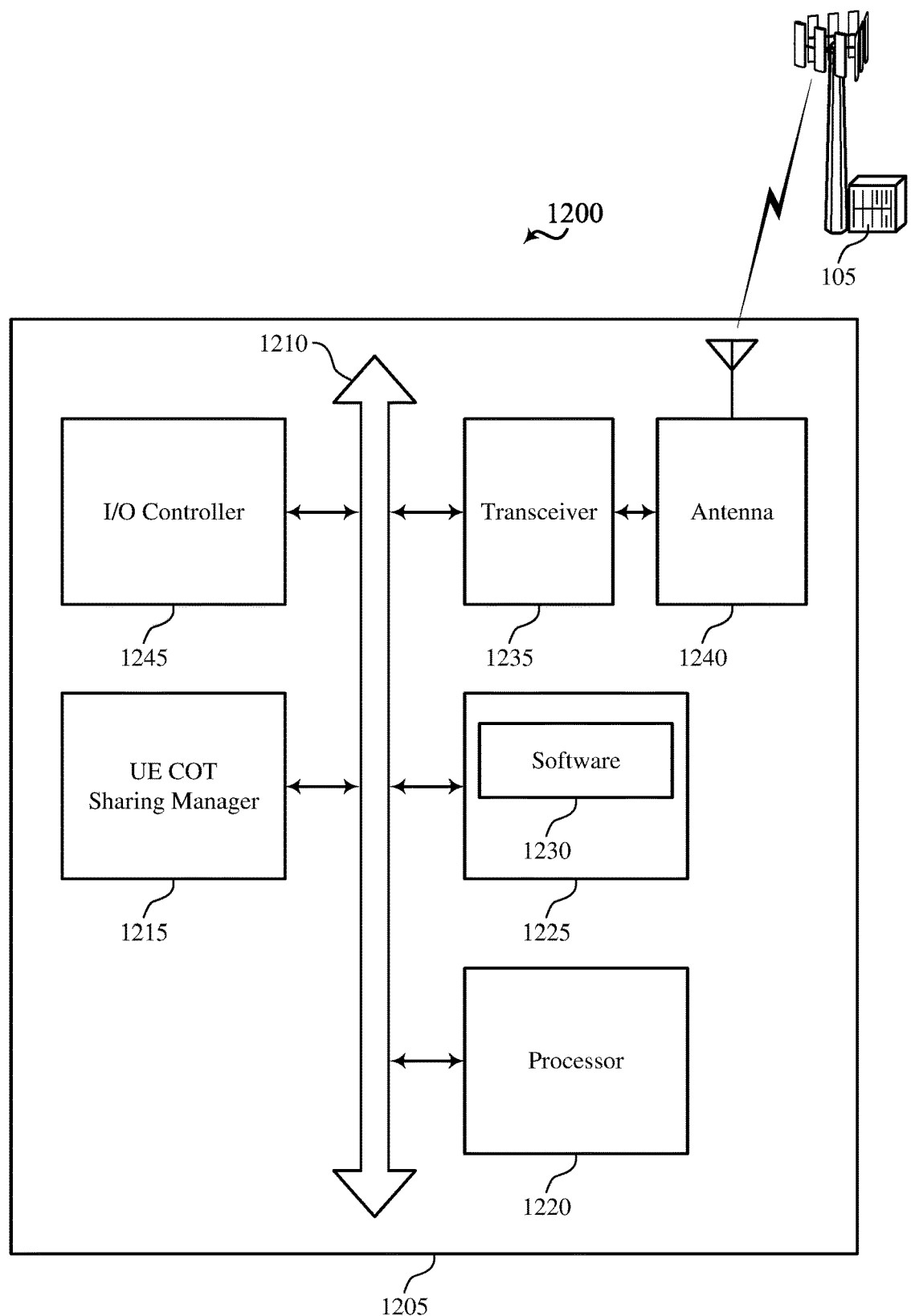
FIG. 12 illustrates a block diagram of a system including a UE that supports UE-to-UE COT sharing in a shared spectrum in accordance with aspects of the present disclosure.

FIG. 12 shows a diagram of a system 1200 including a device 1205 that supports UE-to-UE COT sharing in a shared spectrum in accordance with aspects of the present disclosure. Device 1205 may be an example of or include the components of UE 115, 204, 206 as described above herein. Device 1205 may include components for bi-directional voice and data communications including components for transmitting and receiving communications, including UE COT sharing manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105, 202.

The UE COT sharing manager 1215 may maintain configuration parameters and manage various procedures to support UE-to-UE COT sharing in a shared spectrum as described herein in FIGS. 3-6 and 8.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting operation with multiple BW parts in a shared spectrum).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support multiple BW parts a shared spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. It should be noted that the base stations may be deployed by the same operator or different operators. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communications, comprising:
   acquiring, by a first user equipment (UE), a channel occupancy time (COT) in a shared spectrum using a listen-before-talk (LBT) procedure; and
   responsive to a successful LBT procedure, transmitting, by the first UE, a signal indicating that the COT is being shared with at least one second UE, wherein the transmitting comprises at least one of: broadcasting the signal to the at least one second UE or transmitting the signal via an uplink control information (UCI) message.

2. The method of claim 1, wherein the signal comprises at least one of: an LBT priority class associated with the COT or a duration of the COT.

3. The method of claim 1, wherein the acquiring the COT is associated with at least one of: a configured grant or a scheduled grant.

4. The method of claim 3, further comprising providing a time gap within the COT for the at least one second UE to perform a shortened LBT procedure for an uplink transmission of the at least one second UE.

5. The method of claim 4, wherein the uplink transmission comprises at least one of: an initial transmission associated with a random access (RA) procedure, a configured grant, or a scheduled grant.

6. The method of claim 4, wherein the first UE uses a category 4 (CAT4) LBT procedure;
wherein the at least one second UE is configured to use a CAT1 or CAT2 LBT procedure.

7. The method of claim 1, further comprising receiving, from a base station, information indicating that the COT can be shared with the at least one second UE.

8. The method of claim 7, wherein the information is received via at least one of: a radio resource control (RRC) message or a downlink control information (DCI) message.

9. The method of claim 7, wherein the information further comprises an indication that the COT can be shared by at least one of: time division multiplexing (TDM), frequency division multiplexing (FDM), or spatial division multiplexing (SDM).

10. A method of wireless communications, comprising:
receiving, at a first user equipment (UE), a signal from a second UE, the signal indicating that the second UE has acquired a channel occupancy time (COT) in a shared spectrum and that the COT is being shared with one or more UEs, wherein the receiving comprises receiving the signal via at least one of: a broadcast channel or an uplink control information (UCI) message;
performing, by the first UE, a shortened listen-before-talk (LBT) procedure within the COT; and
responsive to a successful shortened LBT procedure, transmitting, by the first UE, an uplink transmission in the shared spectrum.

11. The method of claim 10, wherein the signal comprises at least one of: an LBT priority class associated with the COT or a duration of the COT.

12. The method of claim 10, wherein the uplink transmission comprises an initial transmission associated a random access (RA) procedure.

13. The method of claim 12, wherein the initial transmission comprises at least one of: a RA preamble associated with a 4-step RA procedure or a message A associated with a 2-step RA procedure.

14. The method of claim 10, wherein the uplink transmission is associated with at least one of: a configured grant or a scheduled grant.

15. The method of claim 10, further comprising receiving information indicating that the COT can be shared by at least one of: time division multiplexing (TDM), frequency division multiplexing (FDM), or spatial division multiplexing (SDM).

16. A user equipment (UE) for wireless communications, comprising:
a processor;
memory in electronic communication with the processor;
instructions stored in the memory, wherein the instructions are executable by the processor to:
acquire a channel occupancy time (COT) in a shared spectrum using a listen-before-talk (LBT) procedure, and
responsive to a successful LBT procedure, transmit a signal indicating that the COT is being shared with at least one second UE, wherein the instructions are further executable by the processor to transmit by at least one of: broadcast the signal to the at least one second UE or transmit the signal via an uplink control information (UCI) message.

17. The UE of claim 16, wherein the signal comprises at least one of: an LBT priority class associated with the COT or a duration of the COT.

18. The UE of claim 16, wherein the instructions executable by the processor to acquire the COT is associated with at least one of: a configured grant or a scheduled grant.

19. The UE of claim 18, wherein the instructions are further executable by the processor to provide a time gap within the COT for the at least one second UE to perform a shortened LBT procedure for an uplink transmission of the at least one second UE.

20. The UE of claim 19, wherein the uplink transmission comprises at least one of: an initial transmission associated with a random access (RA) procedure, a configured grant, or a scheduled grant.

21. The UE of claim 19, wherein the UE uses a category 4 (CAT4) LBT procedure;
wherein the at least one second UE is configured to use a CAT1 or CAT2 LBT procedure.

22. The UE of claim 16, wherein the instructions are further executable by the processor to receive, from a base station, information indicating that the COT can be shared with the at least one second UE.

23. The UE of claim 22, wherein the information is received via at least one of: a radio resource control (RRC) message or a downlink control information (DCI) message.

24. The UE of claim 22, wherein the information further comprises an indication that the COT can be shared by at least one of: time division multiplexing (TDM), frequency division multiplexing (FDM), or spatial division multiplexing (SDM).

25. A user equipment (UE) for wireless communications, comprising:
a processor;
memory in electronic communication with the processor;
instructions stored in the memory, wherein the instructions are executable by the processor to:
receive a signal from a second UE, the signal indicating that the second UE has acquired a channel occupancy time (COT) in a shared spectrum and that the COT is being shared with one or more UEs, wherein the instructions executable by the processor to receive further comprise instruction executable by the processor to receive the signal via at least one of: a broadcast channel or an uplink control information (UCI) message,
perform a shortened listen-before-talk (LBT) procedure within the COT, and
responsive to a successful shortened LBT procedure, transmit an uplink transmission in the shared spectrum.

26. The UE of claim 25, wherein the signal comprises at least one of: an LBT priority class associated with the COT or a duration of the COT.

27. The UE of claim 25, wherein the uplink transmission comprises an initial transmission associated with at least one of: a random access (RA) procedure, a configured grant, or a scheduled grant.

28. The UE of claim 27, wherein the initial transmission comprises at least one of: a RA preamble associated with a 4-step RA procedure or a message A associated with a 2-step RA procedure.

29. The UE of claim 25, wherein the instructions are further executable by the processor to receive information indicating that the COT can be shared by at least one of: time division multiplexing (TDM), frequency division multiplexing (FDM), or spatial division multiplexing (SDM).

* * * * *